United States Patent
Teraoka et al.

[19]

[11] Patent Number: 5,865,883
[45] Date of Patent: Feb. 2, 1999

[54] INK, INK CARTRIDGE AND RECORDING UNIT, INK-JET RECORDING METHOD AND INK-JET RECORDING APPARATUS

[75] Inventors: Hisashi Teraoka, Kawasaki; Akira Nagashima, Tokyo, both of Japan

[73] Assignee: Canon Kabushiki Kaisha, Tokyo, Japan

[21] Appl. No.: 815,948

[22] Filed: Mar. 13, 1997

[30] Foreign Application Priority Data

Mar. 14, 1996 [JP] Japan .................................. 8-084531

[51] Int. Cl.$^6$ .................................. C09D 11/02
[52] U.S. Cl. .................................. 106/31.32; 106/31.43; 106/31.58
[58] Field of Search .................. 106/31.32, 31.43, 106/31.58

[56] References Cited

U.S. PATENT DOCUMENTS

| | | | |
|---|---|---|---|
| 5,078,790 | 1/1992 | Tochihara et al. | 106/31.43 |
| 5,131,949 | 7/1992 | Tochihara et al. | 106/31.43 |
| 5,132,700 | 7/1992 | Tochihara et al. | 347/100 |
| 5,213,613 | 5/1993 | Nagashima et al. | 106/31.43 |
| 5,258,066 | 11/1993 | Kobayashi et al. | 106/31.58 |
| 5,296,022 | 3/1994 | Kobayashi et al. | 106/31.58 |
| 5,409,529 | 4/1995 | Nagashima et al. | 106/31.43 |
| 5,451,251 | 9/1995 | Mafune et al. | 106/31.48 |
| 5,478,383 | 12/1995 | Nagashima et al. | 106/31.43 |
| 5,482,545 | 1/1996 | Aoki et al. | 106/31.43 |
| 5,549,742 | 8/1996 | Cancellieri | 106/31.43 |
| 5,571,313 | 11/1996 | Mafune et al. | 106/31.43 |

FOREIGN PATENT DOCUMENTS 320559  12/1993  Japan .
6-73324  3/1994  Japan .

*Primary Examiner*—Helene Klemanski
*Attorney, Agent, or Firm*—Fitzpatrick, Cella, Harper & Scinto

[57] ABSTRACT

Provided is an ink used for ink-jet recording, which ink comprises triethanolamine in an amount of 2% by weight or more, but less than 5% by weight based on the total weight of the ink and a dye having a pyrene ring.

144 Claims, 8 Drawing Sheets

INK, INK CARTRIDGE AND RECORDING UNIT, INK-JET RECORDING METHOD AND INK-JET RECORDING APPARATUS

BACKGROUND OF THE INVENTION

1. Field of the Invention

The present invention relates to an ink capable of forming a flourescent image which is suitably used for ink-jet recording, an ink cartridge employing the ink, and an ink-jet recording method and an ink-jet recording apparatus employing the ink.

2. Related Background Art

Hitherto, various compositions have been reported regarding an ink which employs a fluorescent dye containing a pyrene ring as the coloring material primarily for writing materials. For instance, Japanese Patent Application Laid-Open No. 6-73324 has proposed a fluorescent water-based ink for a ball-point pen which comprises a fluorescent dye of from 0.01 to 30%, triethanolamine of from 5 to 50%, a viscosity modifier composed of a high molecular compound, and water, and which has a solid content of from 15 to 60% in a dry state and a viscosity of from 50 to 2,000 cP.

Japanese Patent Application Laid-Open No. 59-43076 has proposed a yellow fluorescent ink for ink-jet recording which provides good properties with improved water- and light-fastnesses by adding a fluorescent whitening agent in an amount of from 1 to 5% to yellow ink.

The foregoing ink disclosed in Japanese Patent Application Laid-Open No. 6-73324, however, is required just to satisfy a desired coloring ability and a light fastness when it is used to produce an image of the single color applied onto a medium such as paper, and it is formulated as such.

Upon forming a fluorescent image by employing an ink-jet recording method, the ink used for producing the fluorescent image is required to provide the performance peculiar to the ink-jet recording method. To be more specific, the ink is required to exhibit various properties for ensuring stable high printing quality in the ink-jet recording, including an anti-clogging property to nozzles, stability in re-ejection property of ink after a printing pause, and a property for minimizing a chance of a whisker-like feathering which may occur when an image is printed on a recording medium such as paper, or of a color bleed in boundary portions of an image due to different color inks.

In addition, when producing a multi-color image by using the ink-jet recording method, a secondary color obtained by mixing two colors such as yellow, red, green, and blue and the like instead of using a single color, or even a tertiary color produced by adding black to the foregoing two colors may be printed. When printing an image of such mixed colors, the mixed-color image is required to show a good coloring ability and a light fastness. No fluorescent ink, however, has been available which can be suitably used for ink-jet recording and which is formulated with attention paid to the foregoing respects.

SUMMARY OF THE INVENTION

The present invention has been made with a view toward solving the problems described above and it is an object of the invention to provide a fluorescent ink suitably used for ink-jet recording, which ink exhibits a good coloring ability and a good light fastness in a mixed-color image formed with other color inks.

It is another object of the present invention to provide an ink cartridge suitably used for ink-jet recording, in which an ink contains a fluorescent dye that exhibits a good coloring ability of fluorescent colors and can restrain fading of a mixed-color image formed with other color inks.

It is still another object of the present invention to provide an ink-jet recording method in which a good coloring ability of a primary color can be exhibited and the fading of a secondary color or a tertiary color can be effectively restrained when printed on various types of recording media and a recording apparatus using the same.

According to the present invention there is provided an ink which is employed for ink-jet recording and comprises triethanolamine in an amount of 2% by weight or more, but less than 5% by weight based on the total weight of the ink and a dye having a pyrene ring.

According to the present invention there is also provided an ink cartridge equipped with an ink holder which holds an ink, wherein the ink is an ink as described above.

According to the present invention there is further provided an ink cartridge which is equipped with a first, second, and third ink holders which hold inks of different colors therein, respectively, and wherein the ink held in the first ink holder is a yellow ink used for ink-jet recording and comprises triethanolamine in an amount of 2% by weight or more, but less than 5% by weight and a dye having a pyrene ring.

According to the present invention there is also still a recording unit which is equipped with first, second, and third ink holders for holding inks of different colors therein, respectively, and a head assembly for ejecting the ink held in the respective ink holders, wherein the ink held in the first ink holder is a yellow ink used for ink-jet recording and comprises triethanolamine in an amount of 2% by weight or more, but less than 5% by weight and a dye having a pyrene ring.

According to the present invention there is still further an ink-jet recording method to eject an ink through an orifice in response to a recording signal and to apply the ejected ink to a recording medium, thereby performing recording, wherein the ink is an ink as described above.

According to the present invention there is also still further provided an ink-jet recording apparatus equipped with a recording head for ejecting an ink, an ink cartridge provided with an ink holder for holding the ink, and an ink supplier for supplying an ink from the ink cartridge to the recording head, wherein the ink is an ink as described above.

According to another embodiment of the present invention there is further also provided an ink-jet recording apparatus equipped with a recording head for ejecting an ink, an ink cartridge provided with first, second and third ink holders for holding inks of different colors, and an ink supplier for supplying ink from the ink cartridge to the recording head, wherein the ink is an ink as described above.

According to another embodiment of the present invention there is further still also provided an ink-jet recording apparatus equipped with a recording unit comprising first, second, and third ink holders which hold inks of different colors, respectively, and a head assembly for ejecting the ink held in the respective ink holders, and means for detachably retaining the recording unit and for transmitting electric signal information to the recording unit, wherein the ink is an ink as described above.

In the foregoing aspects of the present invention, the content of the triethanolamine in the ink, which triethanolamine is considered to be a coloring auxiliary for the fluorescent dye having a pyrene ring, is set to 2% by weight or more, but less than 5% by weight in the total weight of the ink so as to provide advantages that the deterioration of the coloring ability of a single-color image, which has been produced by applying the ink onto various types of recording media such as coated paper, glossy film, OHP film, back print film, etc., can be restrained and that fading of a secondary or tertiary color of an image which has been produced in the secondary or tertiary color on various types of recording media by using the foregoing ink can be effectively restrained.

DETAILED DESCRIPTION OF THE INVENTION

Figure 1:
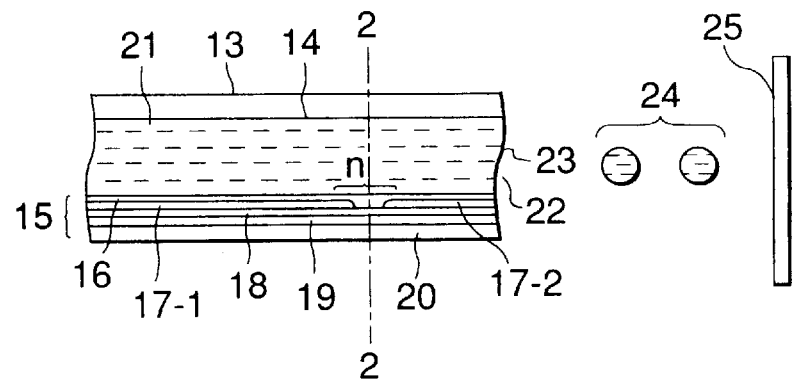
FIG. 1 is a longitudinal sectional view of a head assembly of the ink-jet recording apparatus.

The ink used for an ink-jet recording system according to the present invention which comprises a dye having a pyrene ring and triethanolamine at 2% by weight or more, but less than 5% by weight based on the total weight of the ink (hereinafter referred to as "first ink") will be described in detail below.

As the dye in the ink having the pyrene ring, there is exemplified a water-soluble fluorescent dye which can impart a yellow color, for example, to the ink. Specific examples of the dyes include sodium pyrene tetrasulfonate and sodium pyrene trisulfonate each of which is partially substituted by a hydroxy group, sodium pyrene tetrasulfonate and sodium pyrene trisulfonate each of which is partially substituted by an amino group and sodium pyrene tetrasulfonate and sodium pyrene trisulfonate each of which is partially substituted by an acetylamino group. In particular, the water-soluble dye (C.I. Solvent Green 7) having the structural formula

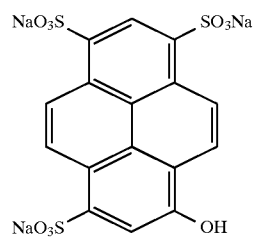

i.e. sodium pyrene trisulfonate which is partially substituted by a hydroxy group can be suitably used in the present invention, since it can provide a yellow ink with a good tone.

There is no particular limitation to the content of the foregoing water-soluble fluorescent dye having a pyrene ring in the first ink. Preferably, however, the content should be in a range of from 0.2 to 8% by weight based on the total weight of the ink, and more preferably, it should be in a range of from 0.5 to 5% by weight based on the total weight of the ink. Setting the content within this range makes it possible to further improve, for example, the reliability of the ink for ink-jet recording in its coloring ability, the stable ejection of ink, and other performance.

The triethanolamine contained in the first ink is employed as a coloring auxiliary for the water-soluble fluorescent dye. The amount of the triethanolamine in the first ink should preferably be 2% by weight or more, but less than 5% by weight (not including 5%) based on the total weight of the ink. Setting the content of triethanolamine within this range makes it possible to achieve a satisfactory coloring ability of a single-color image, e.g. a yellow image, when printed using the first ink on plain paper such as neutralized paper or acid paper and also to restrain fading of a secondary image printed on glossy film or other recording medium by using the first ink and other ink. That is, when the secondary image is formed by a yellow ink as the first ink and a magenta ink as the other ink, fading of the red secondary image can be decreased.

Further, a problem can be solved in which, when the first ink is ejected from a predetermined nozzle of the recording head and then no ink is ejected from the same nozzle for a certain period of time, the subsequent ejection of the first ink from the nozzle tends to be unstable.

Preferably, a pH value of the first ink ranges from 9 to 14, and in particular, from 9.2 to 12. Specifically, setting the pH value of the first ink which comprises the fluorescent dye having the pyrene ring and triethanolamine be 9 or more enables fading of a secondary or tertiary color image to be effectively suppressed when producing the secondary or tertiary color image on various types of recording media by using the ink and other color inks such as magenta and cyan inks. To be more specific, when the first ink is, for example, a yellow ink which comprises Solvent Green 7 mentioned above, and the secondary color is red composed of the first ink and magenta ink, fading of the red can be very effectively restrained.

The adjustment of the pH value should be made by adding to the first ink a hydroxide such as sodium hydroxide, lithium hydroxide, potassium hydroxide or ammonium hydroxide, or an alkali metal salt such as sodium acetate, lithium acetate, potassium acetate, sodium nitrate, lithium nitrate, potassium nitrate, sodium phosphate, lithium phosphate, potassium phosphate, sodium carbonate, lithium carbonate, or potassium carbonate.

There is no particular limitation on the content of the hydroxide or the alkali metal salt so long as the desired pH value can be obtained. However, the content is preferably in a range of from 0.01 to 5% by weight based on the total weight of the ink. Depending on the amount of triethanolamine added, the pH value of the first ink may be 9, or 9.2 or more before making the foregoing adjustment, and in this case, it is not always necessary to adjust the pH. If the pH value of the first ink is about 9, then adjusting the pH value by adding the aforesaid hydroxide or alkali metal salt makes it possible to further restrain fading of the secondary or tertiary color.

Preferably, when preparing the first ink, a mixture of water and a water-soluble organic solvent should be used as a liquid medium for dissolving the dye mentioned above.

Specific examples of the water-soluble organic solvent include amides such as dimethyl formamide and dimethyl acetamide, ketones such as acetone, ethers such as tetrahydrofuran and dioxane, polyalkylene glycols such as polyethylene glycol and polypropylene glycol, alkylene glycols such as ethylene glycol, propylene glycol, butylene glycol, triethylene glycol, hexylene glycol, and diethylene glycol having two to six carbon atoms in the alkylene moiety thereof, 1,2,6-hexane triol, thiodiglycol, glycerin, lower alkyl ethers of polyhydric alcohols such as ethylene glycol monomethyl ether, diethylene glycol monomethyl ether, and triethylene glycol monomethyl ether, monohydric alcohols such as ethanol and isopropyl alcohol, cyclic amide compounds such as N-methyl-2-pyrrolidone, 1,3-dimethyl-2-imidazolidinone, sulforan, dimethyl sulfoxide, 2-pyrrolidone, and $\epsilon$-caprolactam, and imide compounds such as succinimide. In this invention, however, the water-soluble organic solvent is not limited to these compounds. The content of such a water-soluble organic solvent in the ink, when the ink is used for an ink-jet system, is properly in the range of from 10 to 40% by weight, preferably from 10 to 30% by weight, based on the total weight of the ink.

Furthermore, in preparing the first ink, at least one type of surfactant is added to the ink in addition to the ingredients mentioned above, thereby imparting a desired level of penetrability and viscosity to the ink, thus further satisfying the performance required of the ink-jet recording ink.

The surfactant to be used in this case may be an ionic surfactant, a nonionic surfactant, an amphoteric surfactant or a mixture of two or more thereof. Specific examples of the surfactants include anionic surfactants such as fatty acid salts, acid ester salts of higher alcohol, alkyl benzene sulfonates, and higher alcohol phosphoric esters, cationic surfactants such as fatty amine salts and quaternary ammonium salts, nonionic surfactants such as higher alcohol ethylene oxide adducts, alkylphenol ethylene oxide adducts, aliphatic ethylene oxide adducts, polyhydric alcohol fatty acid ester ethylene oxide adducts, aliphatic amide ethylene oxide adducts, higher alkylamine ethylene oxide adducts, polypropylene glycol ethylene oxide adducts, fatty acid esters of polyhydric alcohols, and fatty acid amides of alkanol amines, and amino acid type and betaine type amphoteric surfactants. In this invention, these surfactants can be used invariably advantageously. However, such nonionic surfactants as ethylene oxide adducts of higher alcohols, ethylene oxide adducts of alkyl phenols, ethylene oxide-propylene oxide copolymers, and ethylene oxide adducts of acetylene glycol are used particularly advantageously. Further, in the ethylene oxide adducts mentioned above, those which have addition mol numbers of from 4 to 20 are especially preferable.

There is no particular restriction on the amount of the surfactant added to the ink. However, the amount is preferably within a range of from 0.01 to 10% by weight based on the total weight of the ink. If the amount of the surfactant in the ink is below 0.01% by weight, a desired penetrability level cannot be obtained in most cases, and if the amount of the surfactant exceeds 10% by weight, the initial viscosity of ink becomes too high, which is not preferable, although it depends on the type of the surfactant. Further preferably, the amount of the surfactant added to the ink is in a range of from 0.1 to 5.0% by weight based on the total weight of the ink.

As necessary, there may be added to the first ink additives such as urea and urea derivatives as an alkali source, or a pH value adjuster, a viscosity modifier, a preservative, an antioxidant, an evaporation accelerator, a rust preventive agent, a fungicide, and a chelating agent in order to impart desired performance to the ink.

Figure 9:
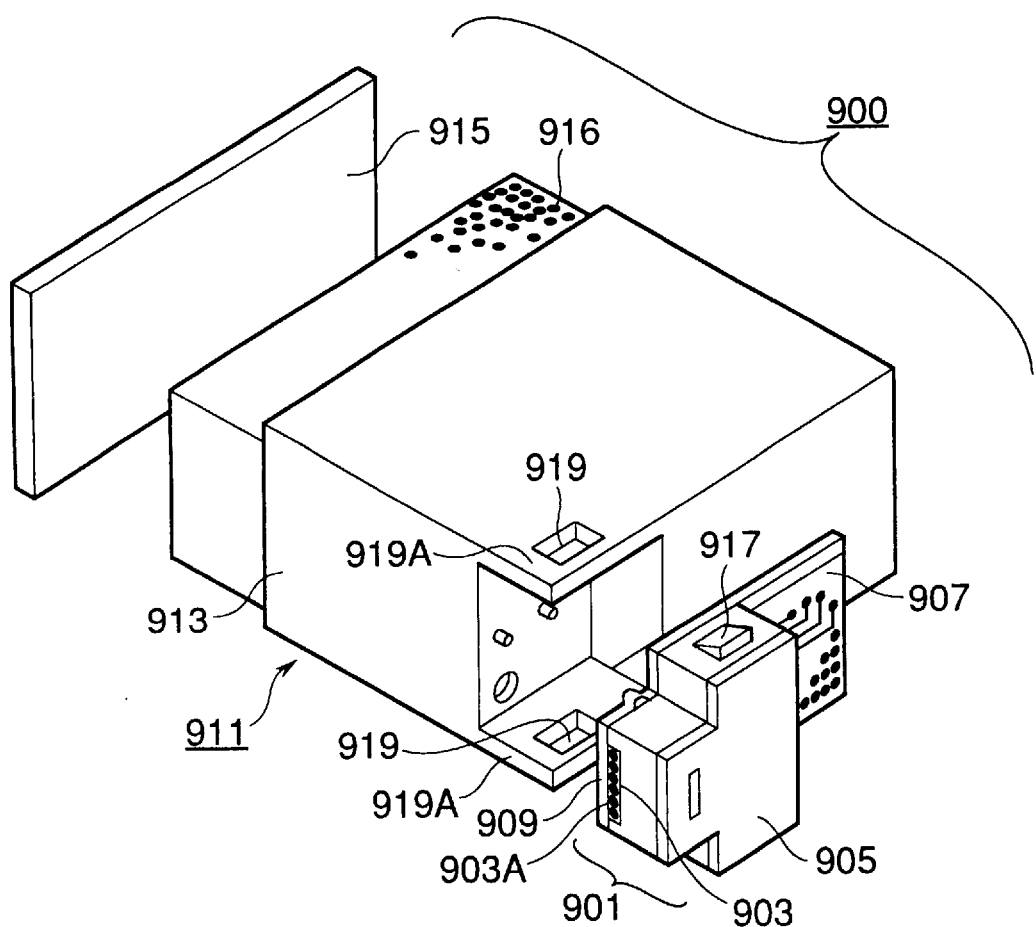
FIG. 9 is an partitioned perspective view of a recording unit according to an embodiment of the present invention.

The recording unit and the ink cartridge will now be described in conjunction with the accompanying drawings. FIG. 9 is a partitioned perspective view showing an embodiment of a recording unit 900 in accordance with the present invention. In FIG. 9, an ink-jet recording head element 901 is composed mainly of an ink ejecting section 903, an ink supply tank 905, a circuit board 907 provided with wiring for transmitting signals for driving ejection energy generating devices, and a base plate 909 which supports them. The ink ejecting section 903 has an ejecting orifice 903A formed on the surface opposed to a recording medium and liquid passages extending therein, electric heat converters or other types of ejection energy generating devices disposed in the liquid passages, and a common liquid chamber communicated with the liquid passages. The ink supply tank 905 serves as a sub-tank which receives an ink supplied from an ink cartridge 911 and leads the ink into the common liquid chamber in the ink ejecting section 903. A housing box 913 is composed of aluminum or the like and it also functions as a heat sink for controlling heat generated by the recording head element as an electric heat converter is driven.

In the aforesaid recording unit, the ink cartridge 911 may be made integral with the ink-jet recording head, or the ink cartridge and the ink-jet recording head may be made independent from each other and may be made detachable as necessary.

The ink cartridge 911 is composed of the housing box 913 which constitutes an ink holder for holding ink, and a cover member 915 for sealing the housing box. The ink holder holds the first ink according to the invention described above.

A projecting section 917 provided on the recording head element 901 is tapered to permit easy connection to the ink cartridge 911. An opening 919 formed in a recording head element holder 919A of the ink cartridge 911 engages with the projecting section 917 to connect the recording head element 901 and the ink cartridge 911.

Figure 5:
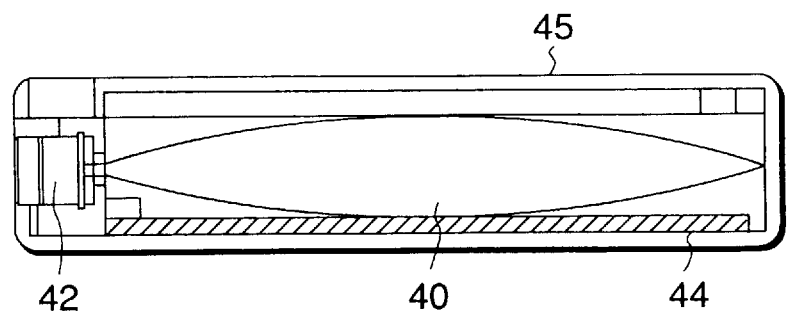
FIG. 5 is a longitudinal sectional view of an ink cartridge.

FIG. 5 is a schematic sectional view of an embodiment of an ink cartridge 45. In FIG. 5, a holder 40 for holding the first ink is an ink bag, and a rubber plug 42 is provided at the distal end thereof. A needle (not shown) is inserted in the plug 42 to allow the first ink to be supplied from the ink bag to the recording head. An ink absorber 44 receives a waste ink. Preferably, the surface of the ink holder which comes in contact with the ink is composed of polyolefin, especially polyethylene, to minimize the deterioration of the ink.

As another embodiment of the ink cartridge, an ink absorber 916 may be built in as shown in FIG. 9 so as to impregnate it with the first ink, thereby holding the first ink in the ink holder. For the ink absorber, polyurethane, cellulose, polyvinyl acetal, etc. may be used.

Figure 10:
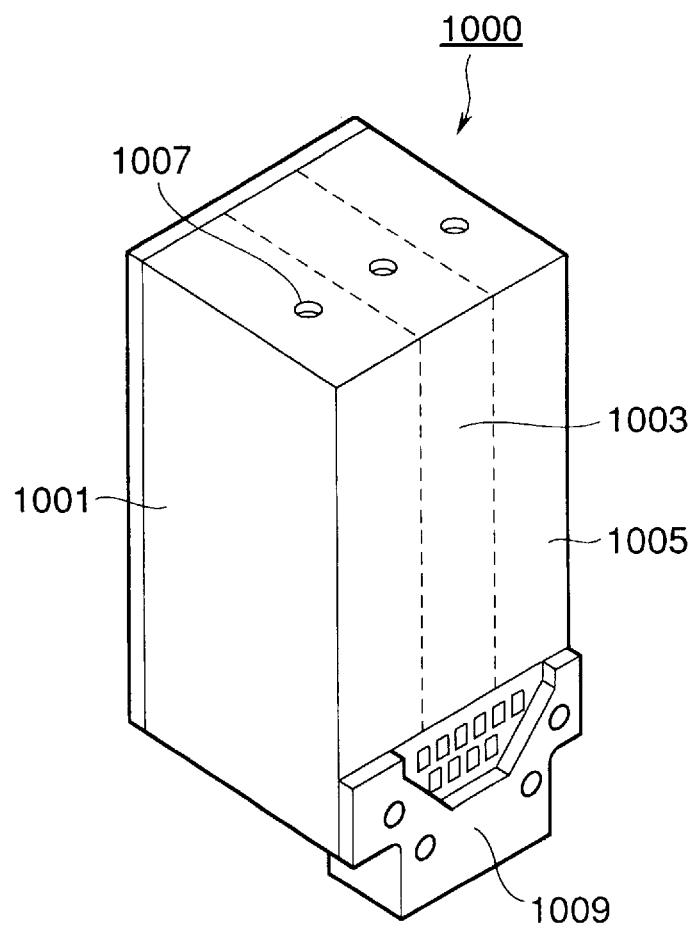
FIG. 10 is a schematic perspective view of the recording unit according to another embodiment of the present invention.

As illustrated in FIG. 10, the ink cartridge may be equipped with second and third ink holders 1003 and 1005, respectively, which hold second and third inks of different colors from that of the first ink, in addition to the first ink holder 1001 which holds the first ink, and all these ink holder may be formed into one piece. In FIG. 10, reference numeral 1007 indicates an air passage for communication of the interior of the ink holders (1001, 1003, and 1005) with the atmosphere, and reference numeral 1009 indicates an ink-jet recording head.

The second ink held in the second ink holder 1003 and the third ink held in the third ink holder 1005 will now be described.

In a case that the first ink in the first ink holder 1001 of the ink cartridge 1000 shown in FIG. 10 is an yellow ink, it is conceivable that the second and third inks are, for example, a magenta ink and a cyan ink, respectively.

There is no particular restriction on the magenta ink. However, the coloring material for the magenta ink is preferably a water-soluble dye, especially a water-soluble fluorescent dye. Employing a water-soluble fluorescent dye makes it possible to produce an image of a sharp fluorescent magenta color or a pastel-tone image. Specific examples as the water-soluble fluorescent dye used for the magenta ink include C.I. Basic Red 1, C.I. Basic Red 2, C.I. Basic Red 9, C.I. Basic Red 12, C.I. Basic Red 13, C.I. Basic Red 14, C.I. Basic Red 17, C.I. Acid Red 51, C.I. Acid Red 52, C.I. Acid Red 92, C.I. Acid Red 94, C.I. Basic Violet 1, C.I. Basic Violet 3, C.I. Basic Violet 7, C.I. Basic Violet 10, and C.I. Basic Violet 14.

The content of the coloring material for the magenta ink should be ranging from 0.2 to 8% by weight, more preferably, from 0.5 to 5% by weight, based on the total weight of this ink. Setting the content of the coloring material within the range enables further improved reliability of the ink-jet ink with respect to coloring ability and stable ink ejection.

In the present invention, it is desirable to add an oxidizing agent to the magenta ink containing the coloring material mentioned above. This makes it possible to better restrain fading of the red color, which is the secondary color of the inks, when printed with the yellow ink having the foregoing composition on glossy film, OHP film, back print film or another type of recording medium.

Preferably, the oxidizing agent added to the magenta ink is, for example, a salt of benzenesulfonic acid or a salt of nitrobenzenesulfonic acid, and further preferably, sodium benzenesulfonate or sodium nitrobenzensulfonate is suitably used for the purpose. There is no particular restrictions on the content of the oxidizing agent added to the magenta ink. However, it should be ranging from 0.01 to 10% by weight based on the total weight of the ink.

There is no limitation on the cyan ink. However, regarding the cyan ink making up the ink set according to the present invention, the coloring material for the cyan ink is preferably a water-soluble dye. Specific examples of the water-soluble dyes used for the cyan ink include C.I. Acid Blue 9, C.I. Acid Blue 13, C.I. Acid Blue 68, C.I. Acid Blue 69, C.I. Acid Blue 138, C.I. Acid Blue 185, C.I. Acid Blue 249, C.I. Acid Blue 258, C.I. Direct Blue 83, C.I. Direct Blue 86, C.I. Direct Blue 87, C.I. Direct Blue 95, C.I. Direct Blue 143, C.I. Direct Blue 166, C.I. Direct Blue 176, and C.I. Direct Blue 199. The content of the coloring material for the cyan ink should be ranging from 0.2 to 8% by weight, more preferably, from 0.5 to 5% by weight based on the total weight of the ink, as in the case of the yellow ink and the magenta ink described above.

Figure 11:
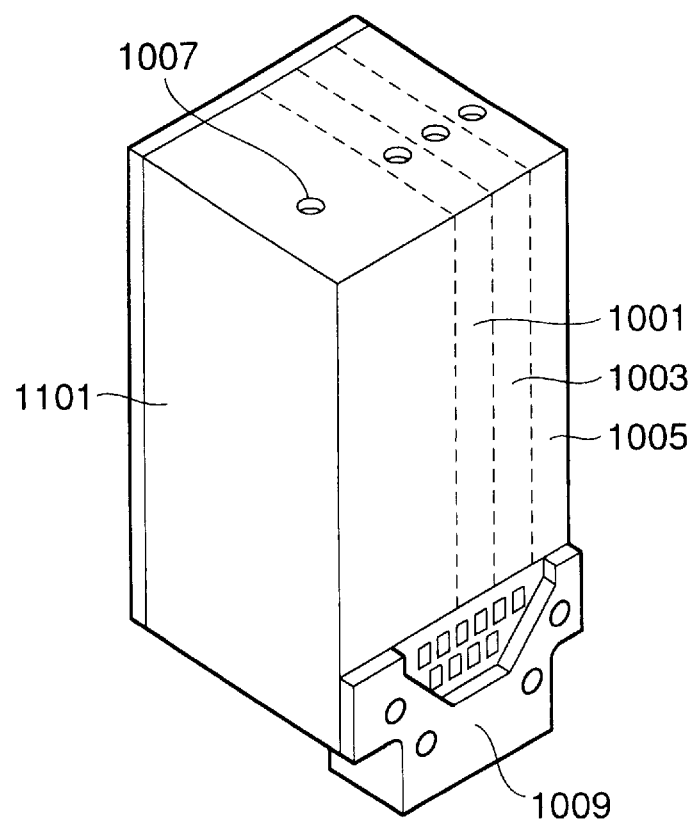
FIG. 11 is a schematic perspective view of the recording unit according to still another embodiment of the present invention.

As a further alternative, the ink cartridge may be equipped with an ink holder 1101 for holding a black ink as shown in FIG. 11 in addition to the three ink holders for holding the inks of three different colors as shown in FIG. 10. Reference numerals in FIG. 11 have the same meaning as in FIG. 10.

Regarding the black ink held in the ink holder 1101 shown in FIG. 11, the coloring material constituting the black ink is preferably a water-soluble dye although there are no particular restrictions. Specific examples of the water-soluble dye used for the black ink include C.I. Direct Black 17, C.I. Direct Black 19, C.I. Direct Black 62, C.I. Direct Black 154, C.I. Food Black 2, C.I. Reactive Black 5, C.I. Acid Black 52, and C.I. Projet Fast Black 2. The content of the water-soluble dye in the black ink should be ranging from 0.2 to 8% by weight, more preferably, from 0.5 to 5% by weight based on the total weight of the ink, as in the case of the yellow ink, the magenta ink, and the cyan ink described above.

When preparing the aforesaid magenta, cyan, and black inks, it is preferable to use a mixture of water and a water-soluble organic solvent as a liquid medium for dissolving the coloring materials. Specific examples of the water-soluble organic solvents include amides such as dimethyl formamide and dimethyl acetamide, ketones such as acetone, ethers such as tetrahydrofuran and dioxane, polyalkylene glycols such as polyethylene glycol and polypropylene glycol, alkylene glycols such as ethylene glycol, propylene glycol, butylene glycol, triethylene glycol, hexylene glycol, and diethylene glycol which have two to six carbon atoms in the alkylene moiety thereof, glycerin, 1,2,6-hexane triol, thiodiglycol, lower alkyl ethers of polyhydric alcohols such as ethylene glycol monomethyl ether, diethylene glycol monomethyl ether, and triethylene glycol monomethyl ether, monohydric alcohols such as ethanol and isopropyl alcohol, cyclic amide compounds such as N-methyl-2-pyrrolidone, 1,3-dimethyl-2-imidazolidinone, sulforan, dimethyl sulfoxide, 2-pyrrolidone, and ε-caprolactam, and imide compounds such as succinimide. This invention, however, does not limit the water-soluble organic solvent to these compounds. The content of such a water-soluble organic solvent in the ink, when the ink is used for an ink-jet system, is properly in the range of from 10 to 40% by weight, preferably 10 to 30% by weight, based on the total weight of the ink.

Furthermore, in preparing the magenta, cyan, and black inks, at least one type of surfactant is added to each ink in addition to the ingredients mentioned above, thereby imparting a desired level of penetrability and viscosity to the inks, thus further satisfying the performance required of the ink-jet recording ink.

The surfactant to be used in this case may be an ionic surfactant, a nonionic surfactant, an amphoteric surfactant or a mixture of two or more thereof. Specific examples of the surfactants include anionic surfactants such as fatty acid salts, acid ester salts of higher alcohol, alkyl benzene sulfonates, and higher alcohol phosphoric esters, cationic surfactants such as fatty amine salts and quaternary ammonium salts, nonionic surfactants such as higher alcohol ethylene oxide adducts, alkylphenol ethylene oxide adducts, aliphatic ethylene oxide adducts, polyhydric alcohol fatty acid ester ethylene oxide adducts, aliphatic amide ethylene oxide adducts, higher alkylamine ethylene oxide adducts, polypropylene glycol ethylene oxide adducts, fatty acid esters of polyhydric alcohols, and fatty acid amides of alkanol amines, and amino acid type and betaine type amphoteric surfactants. In this invention, these surfactants can be used invariably advantageously; however, such nonionic surfactants as ethylene oxide adducts of higher alcohols, ethylene oxide adducts of alkyl phenols, ethylene oxide-propylene oxide copolymers, and ethylene oxide adducts of acetylene glycol are used particularly advantageously. Further, in the ethylene oxide adducts mentioned above, those which have addition mol numbers of from 4 to 20 are especially preferable.

There is no particular restrictions on the amount of the surfactant added to the inks. However, the amount is preferably within a range of from 0.01 to 10% by weight based on the total weight of the ink. If the amount of the surfactant in the ink is below 0.01% by weight, a desired penetrability level cannot be obtained in most cases, and if the amount of the surfactant exceeds 10% by weight, the initial viscosity of the ink becomes too high, which is not preferable, although it depends on the type of the surfactant. Further preferably, the amount of the surfactant added to the ink is in a range of from 0.1 to 5.0% by weight based on the total weight of the ink.

As necessary, there may be added to each of the inks additives in addition to the foregoing ingredients such as urea and urea derivatives as an alkali supplier, or a pH value adjuster, a viscosity modifier, a preservative, an antioxidant, an evaporation accelerator, a rust preventive agent, a fungicide, and a chelating agent in order to impart desired performance to the ink.

The recording unit is ideally used for the ink-jet recording method wherein ink is ejected through an orifice in response to a recording signal to record an image on a recording medium, especially suited for use in the ink-jet recording method wherein ink is ejected by means of thermal energy.

As the recording method which enables the recording unit according to the present invention to be suitably used, there is the ink-jet recording method wherein thermal energy corresponding to a recording signal is applied to the ink held in the recording head so as to generate droplets by the energy. An example of the ink-jet recording apparatus to which such ink-jet recording method is applied will be described below.

Figure 2:
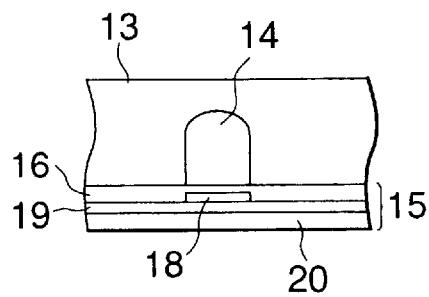
FIG. 2 is a cross-sectional view of the head assembly at the ink-jet recording apparatus.
Figure 3:
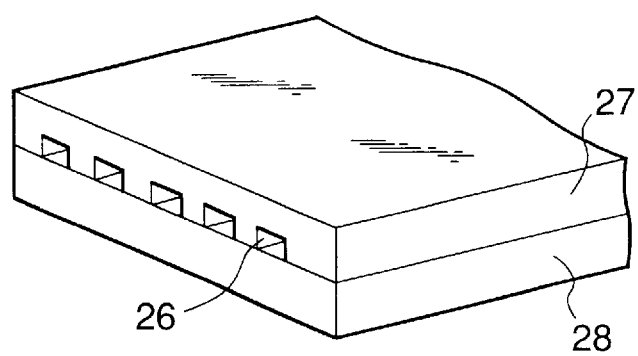
FIG. 3 is a perspective view of the head assembly shown in FIG. 1 which is provided with multiple heads.

First, an example of the configuration of the head which is the essential section of the apparatus is shown in FIGS. 1, 2 and 3. FIG. 1 is a cross-sectional view of a head 13 taken along the flow path of the ink, and FIG. 2 is a cross-sectional view taken along line 2—2 in FIG. 1. The head 13 is formed by bonding a glass, ceramic or plastic plate or the like having a groove 14 through which an ink is passed, to a heating head 15, which is used for thermal recording (the drawings show a thin-film head to which, however, the invention is not limited). The heating head 15 is composed of a protective film 16 made of silicon oxide or the like, aluminum electrodes 17-1 and 17-2, a heating resistor layer 18 made of nichrome or the like, a heat accumulating layer 19, and a substrate 20 made of alumina or the like having a good heat radiation property.

An ink 21 comes up to an ejection orifice (a minute opening) 22 and forms a meniscus 23 due to a pressure P. Now, upon application of electric signals to the electrodes 17-1 and 17-2, the heating head 15 rapidly generates heat at the region shown by n to form bubbles in the ink 21 which is in contact with this region. The meniscus 23 of the ink is projected by the action of the pressure thus produced, and the ink 21 is ejected from the orifice 22 to a recording medium 25 in the form of recording droplets 24.

FIG. 3 illustrates an appearance of a multi-head composed of an array of a number of heads as shown in FIG. 1. The multi-head is formed by closely bonding a glass plate 27 having a number of channels 26 to a heating head 28 similar to the head as illustrated in FIG. 1.

Figure 4:
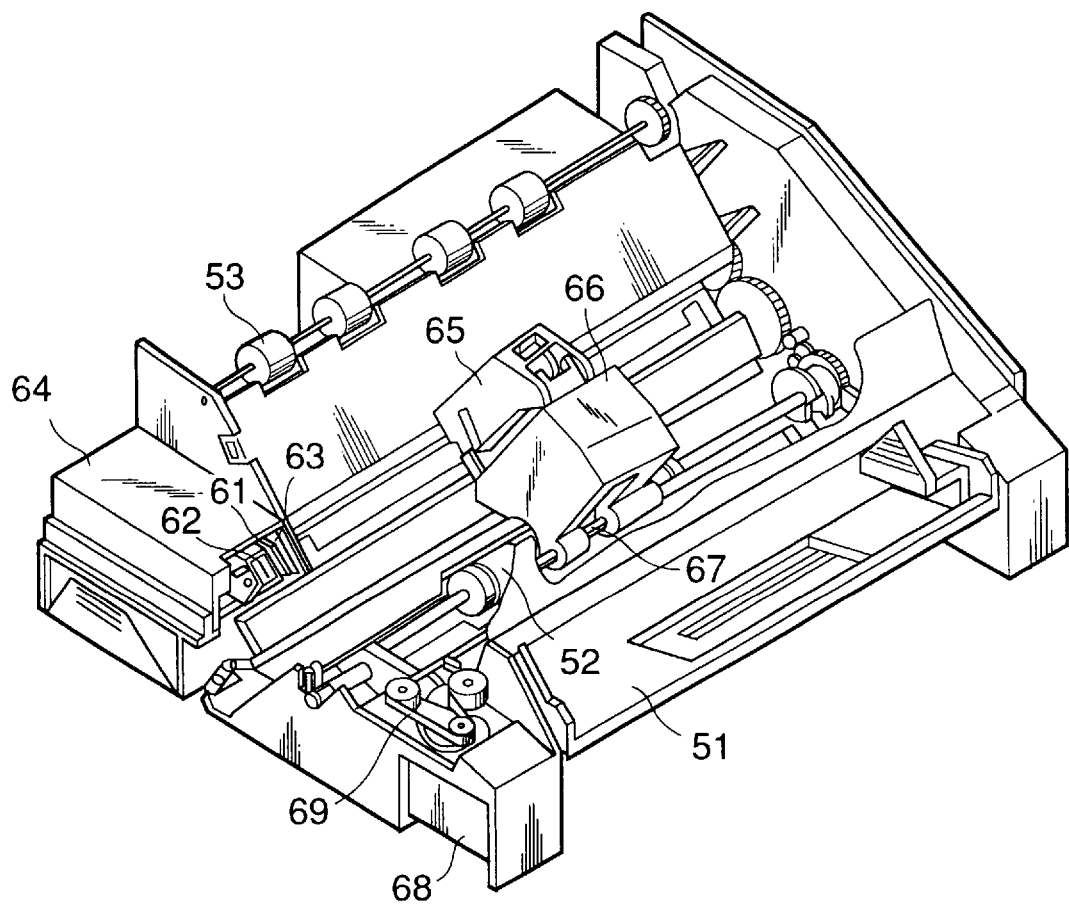
FIG. 4 is a perspective view showing an example of the ink-jet recording apparatus.

FIG. 4 illustrates an example of an ink-jet recording apparatus in which this head has been incorporated. In FIG. 4, reference numeral 65 designates the recording head having an ejection-energy-generating means and serving to eject the ink onto a recording medium set in an opposing relation to the ejection opening face provided with ejection openings to conduct recording. Reference numeral 66 indicates a carriage on which the recording head 65 is mounted so that the recording head 65 can be moved. The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto.

Reference numeral 51 and 52 denote a paper feeding part from which the recording media are separately inserted, and paper feed rollers driven by a motor (not illustrated), respectively. With such a construction, the recording medium is fed to the position opposite to the ejection opening face of the recording face of the recording head, and discharged from a paper discharge section provided with paper discharge rollers 53 with the progress of recording.

Reference numeral 61 designates a blade serving as a wiping member, one end of which is a stationary end held by a blade-holding member to form a cantilever. The blade 61 is provided at a position adjacent to a region in which the recording head 65 operates, and in this embodiment, is held in such a form that it protrudes into the course through which the recording head 65 is moved. Reference numeral 62 indicates a cap, which is provided at a home position adjacent to the blade 61, and is so constituted that it moves in a direction perpendicular to a direction in which the recording head 65 is moved and comes into contact with the face of ejection openings to cap it. Reference numeral 63 denotes an ink-absorbing member provided adjoiningly to the blade 61 and, similar to the blade 61, held in such a form that it protrudes into the course through which the recording head 65 is moved. The above-described blade 61, cap 62 and absorbing member 63 constitute an ejection-recovery portion 64, where the blade 61 and absorbing member 63 remove water, dust and/or the like from the face of the ink-ejecting openings.

In the above construction, the cap 62 in the head recovery portion 64 is receded from the path of motion of the recording head 65 when the recording head 65 is returned to its home position, for example, after completion of recording, and the blade 61 remains protruded into the path of motion. As a result, the ejection opening face of the recording head 65 is wiped. When the cap 62 comes into contact with the ejection opening face of the recording head 65 to cap it, the cap 65 is moved so as to protrude into the path of motion of the recording head 65.

When the recording head 65 is moved from its home position to the position at which recording is started, the cap 62 and the blade 61 are at the same positions as the positions for the wiping as described above. As a result, the ejection opening face of the recording head 65 is also wiped at the time of this movement. The above movement of the recording head 65 to its home position is made not only when the recording is completed or the recording head is recovered for ejection, but also when the recording head is moved between recording regions for the purpose of recording, during which it is moved to the home position adjacent to each recording region at given intervals, where the ejection opening face is wiped in accordance with this movement.

FIG. 5 illustrates an exemplary ink cartridge 45 in which an ink to be fed to the head through an ink-feeding member, for example, a tube is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink-absorbing member for receiving a waste ink. It is preferred in the present invention that the ink container portion is formed of a polyolefin, in particular, polyethylene, at its surface with which the ink comes into contact.

The ink-jet recording apparatus in which the inks according to the present invention are used are not limited to the apparatus as described above in which the head and the ink cartridge are separately provided. Therefore, a device in which these members are integrally formed as shown in FIG. 6 can also be preferably used.

Figure 6:
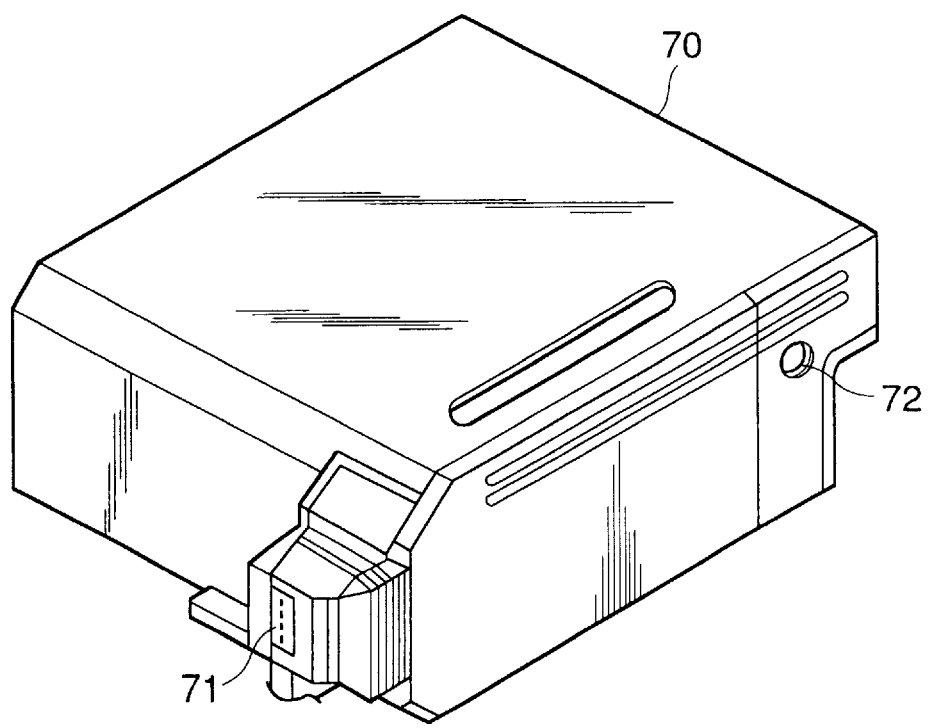
FIG. 6 is a perspective view showing an example of a recording unit.

In FIG. 6, reference numeral 70 designates an ink-jet cartridge, in the interior of which an ink-absorbing member impregnated with an ink is contained. The ink-jet cartridge 70 is so constructed that the ink in such an ink-absorbing member is ejected in the form of ink droplets through a head 71 having a plurality of orifices. In the instrument of the present invention, polyurethane is preferably used as a material for the ink-absorbing member. Reference numeral 72 indicates an air passage for communication of the interior of the ink-jet cartridge 70 with the atmosphere. This ink-jet cartridge 70 can be used in place of the recording head 65 shown in FIG. 4, and is detachably installed on the carriage 66.

As an example of the recording apparatus according to the present invention, the foregoing description has referred to the ink-jet recording apparatus wherein the thermal energy is applied to the ink to eject ink droplets. However, the present invention can also be applied to a piezo-type using a piezoelectric element or other types of ink-jet recording apparatuses.

Figure 7:
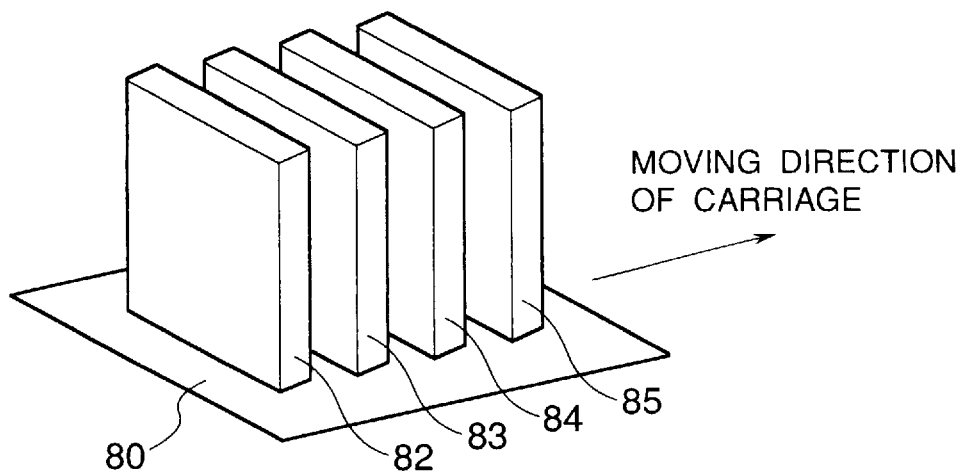
FIG. 7 is a perspective view showing an example of a recording assembly in which a plurality of recording heads are arranged.
Figure 8:
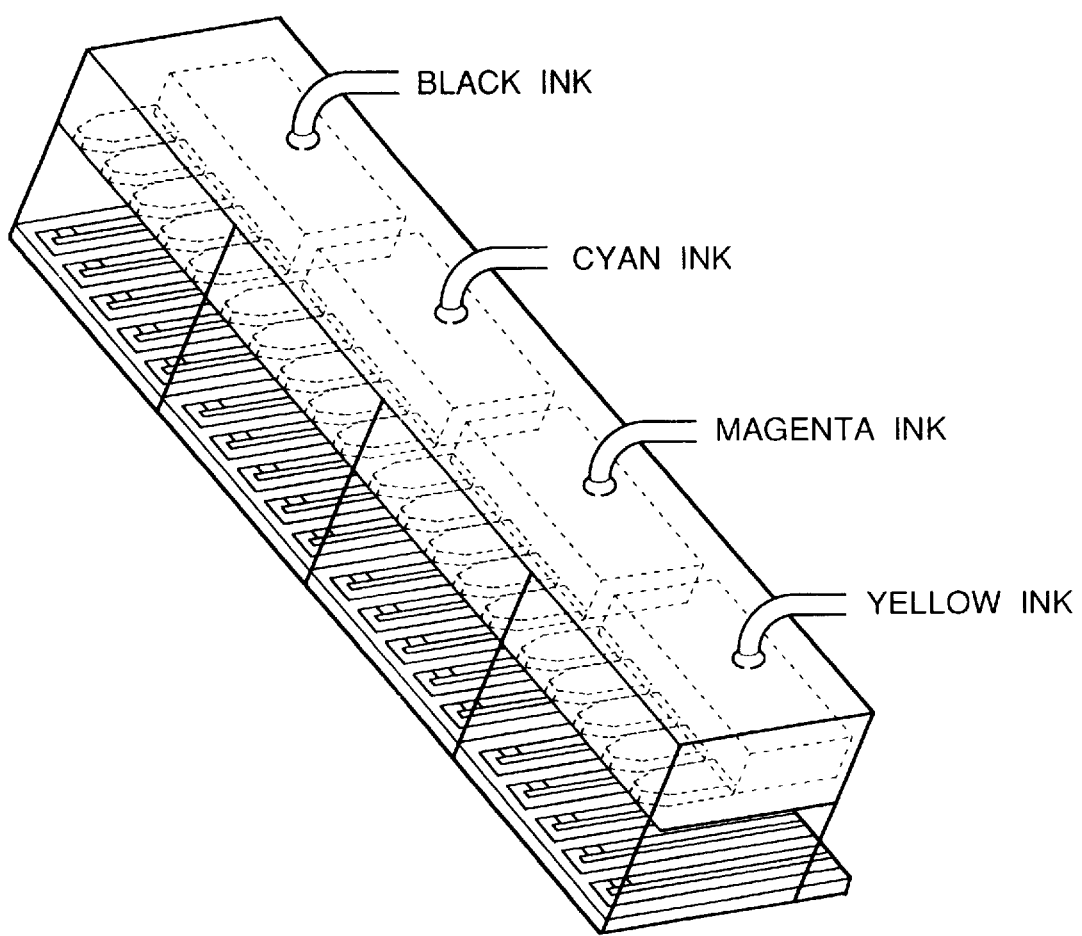
FIG. 8 is a perspective view showing another example of the recording heads.

In the present invention, ink-jet recording is performed by using the recording unit in which, for example, the yellow ink, the magenta ink, and the cyan ink are combined. In this case, a recording apparatus which has, for example, three recording heads on the carriage, is employed, each recording head being the one illustrated in FIG. 3. FIG. 7 shows an example of the recording head assembly which has four recording heads employing four different colors of ink consisting of the three different inks mentioned above and the black ink. Reference numerals 82, 83, 84, and 85 respectively denote the recording heads for ejecting the yellow, magenta, cyan, and black recording inks. Reference numeral 80 is a carriage. The heads are disposed on the recording apparatus and they eject the respective colors of recording ink in response to recording signals. The example shown in FIG. 7 employs four recording heads. However, the present invention is not limited to thereto. As an alternative, a single recording head may have separate liquid passages for the yellow, magenta, cyan, and black inks.

Thus, according to the present invention, when an image of a single color, in particular with a yellow ink, is printed on plain paper, satisfactory fluorescence and coloring ability can be accomplished, and when it is printed on various types of recording medium film such as glossy film, OHP film, and back print film which has cationic substances in the receiving layer thereof, the problem of fading of red of a secondary or tertiary color, especially of the secondary color of the yellow ink and the magenta ink will not be observed. Further, fading of yellow, when the image is printed on various types of coated paper, can be suppressed, allowing a fluorescent-color image with high print quality to be achieved.

The present invention will now be described further specifically by Examples and Comparative Examples. In the following description, the term "part" or "%" is based on weight unless otherwise specified.

EXAMPLE 1

First, the ingredients listed below were mixed and dissolved for each ink and the resulting mixtures were filtered under pressure using a membrane filter which has a pore size of 0.22 $\mu$m (Fluoropore Filter, trade name, made by Sumitomo Denko KK) to prepare the yellow ink, the magenta ink, and the cyan ink according to the present invention. For the yellow ink, 10% lithium hydroxide aqueous solution was added to adjust the pH value to 9.7.

| (Composition of Yellow Ink) | |
|---|---|
| * Solvent Green 7 | 1.5 parts |
| * Triethanolamine | 3.0 parts |
| * Glycerin | 7.5 parts |
| * Diethylene glycol | 10 parts |
| * Acetylenol EH (made by Kawaken Fine Chemical Co.) | 1.0 part |
| * 10% lithium hydroxide aqueous solution | 1.5 parts |
| * Water | 75.5 parts |
| (Composition of Magenta Ink) | |
| * C.I. Acid Red 94 | 2.0 parts |
| * Ethylene glycol | 5 parts |
| * 1,2,6-hexanetriol | 15 parts |
| * Acetylenol EH (made by Kawaken Fine Chemical Co.) | 1.5 parts |
| * Water | 76.5 parts |
| (Composition of Cyan Ink) | |
| * C.I. Direct Blue 86 | 2.0 parts |
| * Thiodiglycol | 9 parts |
| * Urea | 6 parts |
| * Acetylenol EH (made by Kawaken Fine Chemical Co.) | 1.0 parts |
| * Water | 82 parts |

The individual inks prepared as described above were charged in a Canon BC-05 cartridge to prepare a recording unit.

EXAMPLE 2

In the same manner as in Example 1, the yellow ink, the magenta ink, and the cyan ink having the compositions shown below according to the present invention were prepared. For the yellow ink, 10% sodium hydroxide aqueous solution was added to adjust the pH value to 9.7.

| (Composition of Yellow Ink) | |
|---|---|
| * Solvent Green 7 | 1.8 parts |
| * Triethanolamine | 4.0 parts |
| * Thiodiglycol | 8 parts |
| * Glycerin | 6 parts |
| * Acetylenol EH (made by Kawaken Fine Chemical Co.) | 1.0 part |
| * Sodium hydroxide | 2 parts |
| * Urea | 7 parts |
| * Water | 70.2 parts |
| (Composition of Magenta Ink) | |
| * C.I. Acid Red 92 | 1.5 parts |
| * Glycerin | 10 parts |
| * Thiodiglycol | 7 parts |
| * Urea | 8 parts |
| * Acetylenol EH (made by Kawaken Fine Chemical Co.) | 1.5 parts |
| * Water | 72 parts |
| (Composition of Cyan Ink) | |
| * C.I. Direct Blue 199 | 2.0 parts |

| | |
|---|---|
| * Glycerin | 7.5 parts |
| * Ethylene glycol | 7.5 parts |
| * Urea | 7.5 parts |
| * Acetylenol EH (made by Kawaken Fine Chemical Co.) | 1.0 part |
| * Water | 74.5 parts |

The individual inks prepared as described above were charged in the Canon BC-05 cartridge to prepare the recording unit according to the present invention.

EXAMPLE 3

In the same manner as in Example 1, the yellow ink, the magenta ink, and the cyan ink having the compositions shown below were prepared. The yellow ink exhibited a pH value of 9.2. An oxidizing agent containing 1.0 part of sodium benzenesulfonate was added to the magenta ink.

(Composition of Yellow Ink)

| | |
|---|---|
| * Solvent Green 7 | 1.5 parts |
| * Triethanolamine | 3.0 parts |
| * Glycerin | 7.5 parts |
| * Diethylene glycol | 10 parts |
| * Acetylenol EH (made by Kawaken Fine Chemical Co.) | 1.0 part |
| * Water | 77 parts |

(Composition of Magenta Ink)

| | |
|---|---|
| * C.I. Acid Red 92 | 2.0 parts |
| * Ethylene glycol | 5 parts |
| * 1,2,6-hexanetriol | 15 parts |
| * Sodium benzensulfonate | 1.0 part |
| * Acetylenol EH (made by Kawaken Fine Chemical Co.) | 1.5 parts |
| * Water | 75.5 parts |

(Composition of Cyan Ink)

| | |
|---|---|
| * C.I. Direct Blue 86 | 2.0 parts |
| * Thiodiglycol | 9 parts |
| * Urea | 6 parts |
| * Acetylenol EH (made by Kawaken Fine Chemical Co.) | 1.0 part |
| * Water | 82 parts |

The individual inks prepared as described above were charged in the Canon BC-05 cartridge to prepare the recording unit according to the present invention.

EXAMPLE 4

In the same manner as in Example 1, the yellow ink, the magenta ink, and the cyan ink having the compositions shown below were prepared. The yellow ink exhibited a pH value of 9.5. An oxidizing agent containing 1.0 part of sodium m-nitrobenzenesulfonate was added to the magenta ink.

(Composition of Yellow Ink)

| | |
|---|---|
| * Solvent Green 7 | 1.8 parts |
| * Triethanolamine | 4.0 parts |
| * Thiodiglycol | 8 parts |
| * Glycerin | 6 parts |
| * Acetylenol (made by Kawaken Fine Chemical Co.) | 1.0 part |
| * Urea | 7 parts |
| * Water | 72.2 parts |

(Composition of Magenta Ink)

| | |
|---|---|
| * C.I. Acid Red 92 | 1.5 parts |
| * Glycerin | 10 parts |
| * Thiodiglycol | 7 parts |
| * Urea | 8 parts |
| * Acetylenol EH (made by Kawaken Fine Chemical Co.) | 1.5 parts |
| * sodium m-nitrobenzenesulfonate | 1.0 part |
| * Water | 71 parts |

(Composition of Cyan Ink)

| | |
|---|---|
| * C.I. Direct Blue 199 | 2.0 parts |
| * Glycerin | 7.5 parts |
| * Ethylene glycol | 7.5 parts |
| * Urea | 7.5 parts |
| * Acetylenol EH (made by Kawaken Fine Chemical Co.) | 1.0 part |
| * Water | 74.5 parts |

The individual inks prepared as described above were charged in the Canon BC-05 cartridge to prepare the recording unit according to the present invention.

Comparative Example 1

In the same manner as that of Example 1, the yellow ink, the magenta ink, and the cyan ink having the compositions shown below were prepared. The yellow ink exhibited a pH value of 8.6.

(Composition of Yellow Ink)

| | |
|---|---|
| * Solvent Green 7 | 1.5 parts |
| * Triethanolamine | 1.0 part |
| * Ethylene glycol | 7.5 parts |
| * Thiodiglycol | 6.5 parts |
| * Urea | 7.0 parts |
| * Water | 76.5 parts |

(Composition of Magenta Ink)

The magenta ink employed in the ink set of Example 1 was used.

(Composition of Cyan Ink)

The cyan ink employed in the ink set of Example 1 was used.

The respective inks of this Comparative Example prepared as shown above were charged in the Canon BC-05 cartridge to prepare a recording unit.

Comparative Example 2

In the same manner as that of Example 1, the yellow ink, the magenta ink, and the cyan ink having the compositions shown below were prepared. The yellow ink exhibited a pH value of 10.1.

(Composition of Yellow Ink)

| | |
|---|---|
| * Solvent Green 7 | 1.5 parts |
| * Glycerin | 8.0 parts |
| * Thiodiglycol | 7.0 parts |
| * Urea | 7.0 parts |
| * Triethanolamine | 8.0 parts |
| * Acetylenol EH (made by Kawaken Fine Chemical Co.) | 1.0 part |
| * Water | 67.5 parts |

(Composition of Magenta Ink)

| | |
|---|---|
| * C.I. Acid Red 92 | 2.0 parts |
| * Glycerin | 8.0 parts |
| * Ethylene glycol | 10.0 parts |
| * Urea | 5.0 parts |
| * Acetylenol EH (made by Kawaken Fine Chemical Co.) | 1.5 parts |
| * Water | 73.5 parts |

(Composition of Cyan Ink)

| | |
|---|---|
| * C.I. Direct Blue 199 | 2.0 parts |
| * Glycerin | 10.0 parts |

-continued

| | |
|---|---|
| * Thiodiglycol | 5.0 parts |
| * Urea | 5.0 parts |
| * Acetylenol (made by Kawaken Fine Chemical Co.) | 1.0 part |
| * Water | 77.0 parts |

The individual inks prepared in this Comparative Example as shown above were charged in the Canon BC-05 cartridge to prepare the recording unit.

Comparative Example 3

In the same manner as that of Example 1, the yellow ink, the magenta ink, and the cyan ink having the compositions shown below were prepared. The yellow ink exhibited a pH value of 5.5.

| | |
|---|---|
| (Composition of Yellow Ink) | |
| * Solvent Green 7 | 2.0 parts |
| * Glycerin | 6 parts |
| * Ethylene glycol | 11 parts |
| * Water | 81 parts |
| (Composition of Magenta Ink) | |
| * C.I. Acid Red 51 | 1.5 parts |
| * Thiodiglycol | 9 parts |
| * Diethylene glycol | 7 parts |
| * Water | 82.5 parts |
| (Composition of Cyan Ink) | |
| * C.I. Acid Blue 9 | 2.0 parts |
| * 1,2,6-hexanetriol | 10.0 parts |
| * Propylene glycol | 8.0 parts |
| * Water | 80 parts |

The individual inks prepared in this Comparative Example as shown above were charged in the Canon BC-05 cartridge to prepare the recording unit.

[Evaluation]

The ink-jet cartridges obtained from Examples 1 to 4 and Comparative Examples 1 to 3 were individually mounted on BJC-210 made by Canon Inc. to conduct printing tests by using three types of recording media, namely, HR-101 which is coated paper made by Canon Inc., HG-101 which is glossy film made by Canon Inc., and XX which is Xerox 4024 plain paper made by Xerox Co. The images produced on these three different recording media were evaluated. For the printing test, yellow and red solid print patches were printed on the respective recording media. The images were evaluated on four evaluation items, namely, (1) Coloring ability of yellow, (2) Light fastness of a red color, (3) Light fastness of a yellow color, and (4) Re-ejection stability (stable first ejection) after a pause, according to an evaluation method and an evaluation standard shown below. The evaluation results are shown in Table 1.

<Evaluation Method and Evaluation Standard>

(1) Coloring ability of yellow

The yellow solid print patches printed on the three types of recording media, respectively, were visually checked to evaluate them according to the following standard:

A: Sufficient color density and fluorescence are observed.

B: Only light print color density is available.

C: Only decreased print color density can be obtained so that the print is hardly recognizable.

(2) Light fastness of red color

The red solid print patches printed on the three types of recording media, respectively, were left indoors under the irradiation of a fluorescent light for three days before they were visually checked according to the following standard:

A: Changes very little in the red hue.

B: Slightly turned orange.

C: Turned to an intermediate color between orange and yellow.

D: Deteriorated almost to yellow.

(3) Light fastness of yellow color

The yellow solid print patches printed on the three types of recording media, respectively, were left indoors under the irradiation of a fluorescent light for three days before they were visually checked according to the following standard:

A: Changes very little in the color density or fluorescence of yellow.

B: The color density has become slightly thinner and the fluorescence is beginning to fade.

C: Turned dull and the fluorescence has been lost.

(4) Re-ejection stability after a pause (first ejection)

The ink-jet cartridges were left in a thermo-hygrostat set at a temperature of 15° C. and a humidity of 10% for one hour. Then, ink droplets were ejected from a nozzle and the nozzle was held unused for one minute before ink droplets were re-ejected from the same nozzle again. The ejecting state was observed to evaluate the ejecting stability according to the standard shown below:

A: Capable of performing normal printing.

B: Capable of performing printing with no substantial problem in practical use although slight irregularities are observed in printing.

C: A failure to eject ink or unacceptable irregularities are observed.

TABLE 1

| Evaluation Item, etc. | | Examples and Comparative Examples | | | | | | |
|---|---|---|---|---|---|---|---|---|
| | | Ex. 1 | Ex. 2 | Ex. 3 | Ex. 4 | Comp. Ex. 1 | Comp. Ex. 2 | Comp. Ex. 3 |
| pH value of Yellow Ink | | 9.7 | 9.7 | 9.2 | 9.5 | 8.6 | 10.1 | 5.5 |
| Amount of Triethanolamine Added to Yellow Ink | | 3.0 | 4.0 | 3.0 | 4.0 | 1.0 | 8.0 | — |
| Oxidizing agent in Magenta Ink | | No | No | Yes | Yes | No | No | No |
| Coloring ability of Yellow | HR-101 | A | A | A | A | A | A | A |
| | HG-101 | A | A | A | A | A | A | A |
| | XX | A | A | A | A | C | A | C |
| Light fastness of Red | HR-101 | A | A | A | A | A | A | A |
| | HG-101 | B | B | B | B | B | D | A |
| | XX | A | A | A | A | A | A | A |

TABLE 1-continued

| Evaluation Item, etc. | | Ex. 1 | Ex. 2 | Ex. 3 | Ex. 4 | Comp. Ex. 1 | Comp. Ex. 2 | Comp. Ex. 3 |
|---|---|---|---|---|---|---|---|---|
| Light fastness of Yellow | HR-101 | B | B | B | B | C | B | C |
| | HG-101 | A | A | A | A | A | A | A |
| | XX | A | A | A | A | A | A | A |
| Ejecting Stability after Pause | | A | A | A | A | A | C | A |

Note:
The recording media in the Table above are as follows:
HR-101: Coated paper (made by Canon Inc.)
HG-101: Glossy film (made by Canon Inc.)
XX: Xerox 4024 Plain paper (made by Xerox Co.)

What is claimed is:

1. An ink jet ink, which comprises triethanolamine in an amount of 2% by weight or more, but less than 5% based on the total weight of the ink and a dye having a pyrene ring.

2. The ink according to claim 1, wherein said ink has a pH value of 9 or more.

3. The ink according to claim 2, wherein said ink has a pH value of 9.2 or more.

4. The ink according to claim 1, wherein said dye is a water-soluble fluorescent dye.

5. The ink according to claim 4, wherein said water-soluble fluorescent dye is sodium hydroxypyrene tetrasulfonate or sodium hydroxypyrene trisulfonate.

6. The ink according to claim 4, wherein said water-soluble fluorescent dye is sodium aminopyrene tetrasulfonate or sodium aminopyrene trisulfonate.

7. The ink according to claim 4, wherein said water-soluble fluorescent dye is sodium acetylaminopyrene tetrasulfonate or sodium acetylaminopyrene trisulfonate.

8. The ink according to claim 5, wherein said water-soluble fluorescent dye is sodium hydroxy pyrene trisulfonate.

9. The ink according to claim 1, comprising said dye in an amount of from 0.2 to 8% by weight based on the total weight of the ink.

10. The ink according to claim 4, comprising said dye in an amount of from 0.5 to 5% by weight of said dye based on the total weight of the ink.

11. The ink according to claim 1, further comprising a hydroxide or an alkali metal salt.

12. The ink according to claim 11, further comprising said hydroxide in an amount of from 0.01 to 5% by weight based on the total weight of the ink.

13. The ink according to claim 11, further comprising said alkali metal salt in an amount of from 0.01 to 5% by weight based on the total weight of the ink.

14. The ink according to claim 11, wherein said hydroxide is at least one selected from the group consisting of sodium hydroxide, lithium hydroxide, potassium hydroxide, and ammonium hydroxide.

15. The ink according to claim 11, wherein said alkali metal salt is selected from the group consisting of sodium acetate, lithium acetate, potassium acetate, sodium nitrate, lithium nitrate, potassium nitrate, sodium phosphate, lithium phosphate, potassium phosphate, sodium carbonate, lithium carbonate, and potassium carbonate.

16. The ink according to claim 1, further comprising a mixture of water and a water-soluble organic solvent.

17. The ink according to claim 16, comprising said water-soluble organic solvent in an amount of from 10 to 40% by weight based on the total weight of the ink.

18. The ink according to claim 17, wherein said water-soluble organic solvent is at least one selected from the group consisting of amides, ketones, ethers, polyalkylene glycols, alkylene glycols, lower alkyl ethers of such polyhydric alcohols, monohydric alcohols, cyclic amide compounds, and imide compounds.

19. The ink according to claim 1, further comprising a surfactant.

20. The ink according to claim 19, wherein said surfactant is at least one selected from the group consisting of ionic surfactants, nonionic surfactants, and amphoteric surfactants.

21. The ink according to claim 19, wherein said surfactant is at least one selected from the group consisting of ethylene oxide adducts of higher alcohols, ethylene oxide adducts of alkyl phenols, ethylene oxide-propylene oxide copolymers, and ethylene oxide adducts of acetylene glycol.

22. An ink cartridge equipped with an ink holder which holds an ink, wherein said ink comprises a dye having a pyrene ring and triethanolamine in an amount of 2% by weight or more, but less than 5% by weight based on the total weight of the ink.

23. The ink cartridge according to claim 22, wherein said ink has a pH value of 9 or more.

24. The ink cartridge according to claim 23, wherein said ink has a pH value of 9.2 or more.

25. The ink cartridge according to claim 22, wherein said dye is a water-soluble fluorescent dye.

26. The ink cartridge according to claim 25, wherein said water-soluble fluorescent dye is sodium hydroxypyrene tetrasulfonate or sodium hydroxypyrene trisulfonate.

27. The ink cartridge according to claim 25, wherein said water-soluble fluorescent dye is sodium aminopyrene tetrasulfonate or sodium aminopyrene trisulfonate.

28. The ink cartridge according to claim 25, wherein said water-soluble fluorescent dye is sodium acetylaminopyrene tetrasulfonate or sodium acetylaminopyrene trisulfonate.

29. The ink cartridge according to claim 25, wherein said water-soluble fluorescent dye is sodium hydroxypyrene trisulfonate.

30. The ink cartridge according to claim 22, wherein said ink comprises said dye in an amount of from 0.2 to 8% by weight based on the total weight of the ink.

31. The ink cartridge according to claim 30, comprising said dye in an amount of from 0.5 to 5% by weight based on the total weight of the ink.

32. The ink cartridge according to claim 22, wherein said ink comprises further a hydroxide or an alkali metal salt.

33. The ink cartridge according to claim 32, wherein said ink comprises said hydroxide in an amount of from 0.01 to 5% by weight based on the total weight of the ink.

34. The ink cartridge according to claim 32, wherein said ink comprises said alkali metal salt in an amount of from 0.01 to 5% by weight based on the total weight of the ink.

35. The ink cartridge according to claim 32, wherein said hydroxide is one selected from the group consisting of sodium hydroxide, lithium hydroxide, potassium hydroxide, and ammonium hydroxide.

36. The ink cartridge according to claim 32, wherein said alkali metal salt is selected from the group consisting of sodium acetate, lithium acetate, potassium acetate, sodium nitrate, lithium nitrate, potassium nitrate, sodium phosphate, lithium phosphate, potassium phosphate, sodium carbonate, lithium carbonate, and potassium carbonate.

37. The ink cartridge according to claim 22, wherein said ink comprises a mixture of water and a water-soluble organic solvent.

38. The ink cartridge according to claim 37, wherein said ink comprises said water-soluble organic solvent in an amount of from 10 to 40% by weight based on the total weight of the ink.

39. The ink cartridge according to claim 37, wherein said water-soluble organic solvent is at least one selected from the group consisting of amides, ketones, ethers, polyalkylene glycols, alkylene glycols, lower alkyl ethers of such polyhydric alcohols, monohydric alcohols, cyclic amide compounds, and imide compounds.

40. The ink cartridge according to claim 22, wherein said ink holder is made of polyethylene.

41. The ink cartridge according to claim 22, wherein said ink further comprises a surfactant.

42. The ink cartridge according to claim 41, wherein said surfactant is at least one selected from the group consisting of ionic surfactants, nonionic surfactants, and amphoteric surfactants.

43. The ink cartridge according to claim 41, wherein said surfactant is at least one selected from the group consisting of ethylene oxide adducts of higher alcohols, ethylene oxide adducts of alkyl phenols, ethylene oxide-propylene oxide copolymers, and ethylene oxide adducts of acetylene glycol.

44. An ink cartridge equipped with first, second, and third ink holders which hold inks of different colors, wherein the ink held in said first ink holder is a yellow ink employed for ink-jet recording comprising triethanolamine in an amount of 2% by weight or more, but less than 5% based on the total weight of the ink and a dye having a pyrene ring.

45. The ink cartridge according to claim 44, wherein said yellow ink has a pH value of 9 or more.

46. The ink cartridge according to claim 45, wherein said yellow ink has a pH value of 9.2 or more.

47. The ink cartridge according to claim 44, wherein said dye is a water-soluble fluorescent dye.

48. The ink cartridge according to claim 47, wherein said water-soluble fluorescent dye is sodium hydroxypyrene tetrasulfonate or sodium hydroxypyrene trisulfonate.

49. The ink cartridge according to claim 47, wherein said water-soluble fluorescent dye is sodium aminopyrene tetrasulfonate or sodium aminopyrene trisulfonate.

50. The ink cartridge according to claim 47, wherein said water-soluble fluorescent dye is sodium acetylaminopyrene tetrasulfonate or sodium acetylaminopyrene trisulfonate.

51. The ink cartridge according to claim 47, wherein said water-soluble fluorescent dye is sodium hydroxypyrene trisulfonate.

52. The ink cartridge according to claim 44, wherein said yellow ink comprises said dye in an amount of from 0.2 to 8% by weight based on the total weight of the ink.

53. The ink cartridge according to claim 52, wherein said yellow ink comprises said dye in an amount of from 0.5 to 5% by weight based on the total weight of the ink.

54. The ink cartridge according to claim 44, wherein said yellow ink comprises a hydroxide or an alkali metal salt.

55. The ink cartridge according to claim 54, wherein said ink comprises said hydroxide in an amount of from 0.01 to 5% by weight based on the total weight of the ink.

56. The ink cartridge according to claim 54, wherein said yellow ink comprises said alkali metal salt in an amount of from 0.01 to 5% by weight based on the total weight of the ink.

57. The ink cartridge according to claim 54, wherein said hydroxide is one selected from the group consisting of sodium hydroxide, lithium hydroxide, potassium hydroxide, and ammonium hydroxide.

58. The ink cartridge according to claim 54, wherein said alkali metal salt is selected from the group consisting of sodium acetate, lithium acetate, potassium acetate, sodium nitrate, lithium nitrate, potassium nitrate, sodium phosphate, lithium phosphate, potassium phosphate, sodium carbonate, lithium carbonate, and potassium carbonate.

59. The ink cartridge according to claim 44, wherein said yellow ink comprises a mixture of water and a water-soluble organic solvent.

60. The ink cartridge according to claim 59, wherein said yellow ink comprises said water-soluble organic solvent in an amount of from 10 to 40% by weight based on the total weight of the ink.

61. The ink cartridge according to claim 59, wherein said water-soluble organic solvent is at least one selected from the group consisting of amides, ketones, ethers, polyalkylene glycols, alkylene glycols, lower alkyl ethers of such polyhydric alcohols, monohydric alcohols, cyclic amide compounds, and imide compounds.

62. The ink cartridge according to claim 44, wherein said yellow ink comprises further a surfactant.

63. The ink cartridge according to claim 62, wherein said surfactant is at least one selected from the group consisting of ionic surfactants, nonionic surfactants, and amphoteric surfactants.

64. The ink cartridge according to claim 62, wherein said surfactant is at least one selected from the group consisting of ethylene oxide adducts of higher alcohols, ethylene oxide adducts of alkyl phenols, ethylene oxide-propylene oxide copolymers, and ethylene oxide adducts of acetylene glycol.

65. The ink cartridge according to claim 44, wherein the inks held in said second and third ink holders are a magenta ink and a cyan ink.

66. The ink cartridge according to claim 65, wherein said magenta ink is an ink which comprises a water-soluble dye as a coloring material.

67. The ink cartridge according to claim 66, wherein said magenta ink comprises said water-soluble dye in an amount of from 0.2 to 8% by weight based on the total weight of the ink.

68. The ink cartridge according to claim 66, wherein said water-soluble dye is at least one dye selected from the group consisting of C.I. Basic Red 1, C.I. Basic Red 2, C.I. Basic Red 9, C.I. Basic Red 12, C.I. Basic Red 13, C.I. Basic Red 14, C.I. Basic Red 17, C.I. Acid Red 51, C.I. Acid Red 52, C.I. Acid Red 92, C.I. Acid Red 94, C.I. Basic Violet 1, C.I. Basic Violet 3, C.I. Basic Violet 7, C.I. Basic Violet 10, and C.I. Basic Violet 14.

69. The ink cartridge according to claim 65, wherein said magenta ink comprises a mixture of water and a water-soluble organic solvent.

70. The ink cartridge according to claim 69, wherein said magenta ink comprises said water-soluble organic solvent in an amount of from 10 to 40% by weight based on the total weight of the ink.

71. The ink cartridge according to claim 69, wherein said water-soluble organic solvent is at least one selected from the group consisting of amides, ketones, ethers, polyalkylene glycols, alkylene glycols, lower alkyl ethers of such polyhydric alcohols, monohydric alcohols, cyclic amide compounds, and imide compounds.

72. The ink cartridge according to claim 65, wherein said magenta ink further comprises an oxidizing agent.

73. The ink cartridge according to claim 72, wherein said oxidizing agent is a salt of benzenesulfonic acid or a salt of nitrobenzenesulfonic acid.

74. The ink cartridge according to claim 73, wherein said salt of benzenesulfonic acid or said salt of nitrobenzenesulfonic acid is a sodium salt.

75. The ink cartridge according to claim 65, wherein said magenta ink comprises further a surfactant.

76. The ink cartridge according to claim 75, wherein said surfactant is at least one selected from the group consisting of ionic surfactants, nonionic surfactants, and amphoteric surfactants.

77. The ink cartridge according to claim 75, wherein said surfactant is at least one selected from the group consisting of ethylene oxide adducts of higher alcohols, ethylene oxide adducts of alkyl phenols, ethylene oxide-propylene oxide copolymers, and ethylene oxide adducts of acetylene glycol.

78. The ink cartridge according to claim 65, wherein said cyan ink comprises a water-soluble dye as a coloring material.

79. The ink cartridge according to claim 78, wherein said cyan ink comprises said water-soluble dye in an amount of from 0.2 to 8% by weight based on the total weight of the ink.

80. The ink cartridge according to claim 78, wherein said water-soluble dye is at least one selected from the group consisting of C.I. Acid Blue 9, C.I. Acid Blue 13, C.I. Acid Blue 68, C.I. Acid Blue 69, C.I. Acid Blue 138, C.I. Acid Blue 185, C.I. Acid Blue 249, C.I. Acid Blue 258, C.I. Direct Blue 83, C.I. Direct Blue 86, C.I. Direct Blue 87, C.I. Direct Blue 95, C.I. Direct Blue 143, C.I. Direct Blue 166, C.I. Direct Blue 176, and C.I. Direct Blue 199.

81. The ink cartridge according to claim 65, wherein said cyan ink comprises a mixture of water and a water-soluble organic solvent.

82. The ink cartridge according to claim 81, wherein said cyan ink comprises said water-soluble organic solvent in an amount of from 10 to 40% by weight based on the total weight of the ink.

83. The ink cartridge according to claim 81, wherein said water-soluble organic solvent is at least one selected from the group consisting of amides, ketones, ethers, polyalkylene glycols, alkylene glycols, lower alkyl ethers of such polyhydric alcohols, monohydric alcohols, cyclic amide compounds, and imide compounds.

84. The ink cartridge according to claim 65, wherein said cyan ink comprises further a surfactant.

85. The ink cartridge according to claim 84, wherein said surfactant is at least one selected from the group consisting of ionic surfactants, nonionic surfactants, and amphoteric surfactants.

86. The ink cartridge according to claim 84, wherein said surfactant is at least one selected from the group consisting of ethylene oxide adducts of higher alcohols, ethylene oxide adducts of alkyl phenols, ethylene oxide-propylene oxide copolymers, and ethylene oxide adducts of acetylene glycol.

87. The ink cartridge according to claim 44, further comprising a fourth ink holder.

88. The ink cartridge according to claim 87, wherein the ink held in said fourth ink holder is a black ink.

89. The ink cartridge according to claim 88, wherein said black ink comprises a mixture of water and water-soluble organic solvent.

90. The ink cartridge according to claim 89, wherein said black ink comprises said water-soluble organic solvent in an amount of from 10 to 40% by weight based on the total weight of the ink.

91. The ink cartridge according to claim 89, wherein said water-soluble organic solvent is at least one selected from the group consisting of amides, ketones, ethers, polyalkylene glycols, alkylene glycols, lower alkyl ethers of such polyhydric alcohols, monohydric alcohols, cyclic amide compounds, and imide compounds.

92. A recording unit comprising a first ink holder, a second ink holder, and a third ink holder for holding inks of different colors, and a head assembly for ejecting said inks held in the respective ink holders, wherein the ink held in said first ink holder is a yellow ink for ink-jet recording comprising triethanolamine in an amount of 2% by weight or more, but less than 5% based on the total weight of the ink and a dye having a pyrene ring.

93. The recording unit according to claim 92, wherein said yellow ink has a pH value of 9 or more.

94. The recording unit according to claim 93, wherein said yellow ink has a pH value of 9.2 or more.

95. The recording unit according to claim 92, wherein said dye is a water-soluble fluorescent dye.

96. The recording unit according to claim 95, wherein said water-soluble fluorescent dye is sodium hydroxypyrene tetrasulfonate or sodium hydroxypyrene trisulfonate.

97. The recording unit according to claim 95, wherein said water-soluble fluorescent dye is sodium aminopyrene tetrasulfonate or sodium aminopyrene trisulfonate.

98. The recording unit according to claim 95, wherein said water-soluble fluorescent dye is sodium acetylaminopyrene tetrasulfonate or sodium acetylaminopyrene trisulfonate.

99. The recording unit according to claim 95, wherein said water-soluble fluorescent dye is sodium hydroxypyrene trisulfonate.

100. The recording unit according to claim 92, wherein said yellow ink comprises said dye in an amount of from 0.2 to 8% by weight based on the total weight of the ink.

101. The recording unit according to claim 100, wherein said yellow ink comprises said dye in an amount of from 0.5 to 5% by weight based on the total weight of the ink.

102. The recording unit according to claim 92, wherein said yellow ink further comprises a hydroxide or an alkali metal salt.

103. The recording unit according to claim 102, wherein said yellow ink comprises said hydroxide in an amount of from 0.01 to 5% by weight based on the total weight of the ink.

104. The recording unit according to claim 102, wherein said ink comprises said alkali metal salt in an amount of from 0.01 to 5% by weight based on the total weight of the ink.

105. The recording unit according to claim 102, wherein said hydroxide comprises at least one selected from the group consisting of sodium hydroxide, lithium hydroxide, potassium hydroxide, and ammonium hydroxide.

106. The recording unit according to claim 102, wherein said alkali metal salt is selected from the group consisting of sodium acetate, lithium acetate, potassium acetate, sodium nitrate, lithium nitrate, potassium nitrate, sodium phosphate, lithium phosphate, potassium phosphate, sodium carbonate, lithium carbonate, and potassium carbonate.

107. The recording unit according to claim 92, wherein said yellow ink further comprises a mixture of water and a water-soluble organic solvent.

108. The recording unit according to claim 107, wherein said yellow ink comprises said water-soluble organic solvent in an amount of from 10 to 40% by weight based on the total weight of the ink.

109. The recording unit according to claim 107, wherein said water-soluble organic solvent is at least one selected from the group consisting of amides, ketones, ethers, polyalkylene glycols, alkylene glycols, lower alkyl ethers of such polyhydric alcohols, monohydric alcohols, cyclic amide compounds, and imide compounds.

110. The recording unit according to claim 92, wherein said yellow ink comprises further a surfactant.

111. The recording unit according to claim 110, wherein said surfactant is at least one selected from the group consisting of ionic surfactants, nonionic surfactants, and amphoteric surfactants.

112. The recording unit according to claim 110, wherein said surfactant is at least one selected from the group consisting of ethylene oxide adducts of higher alcohols, ethylene oxide adducts of alkyl phenols, ethylene oxide-propyethylene oxide polymers, and ethylene oxide adducts of acetylene glycol.

113. The recording unit according to claim 92, wherein the inks held in said second and third ink holders are a magenta ink and a cyan ink.

114. The recording unit according to claim 113, wherein said magenta ink is an ink which comprises a water-soluble dye as a coloring material.

115. The recording unit according to claim 114, wherein said magenta ink comprises said water-soluble dye in an amount of from 0.2 to 8% by weight based on the total weight of the ink.

116. The recording unit according to claim 114, wherein said water-soluble dye is at least one dye selected from the group consisting of C.I. Basic Red 1, C.I. Basic Red 2, C.I. Basic Red 9, C.I. Basic Red 12, C.I. Basic Red 13, C.I. Basic Red 14, C.I. Basic Red 17, C.I. Acid Red 51, C.I. Acid Red 52, C.I. Acid Red 92, C.I. Acid Red 94, C.I. Basic Violet 1, C.I. Basic Violet 3, C.I. Basic Violet 7, C.I. Basic Violet 10, and C.I. Basic Violet 14.

117. The recording unit according to claim 113, wherein said magenta ink further comprises a mixture of water and a water-soluble organic solvent.

118. The recording unit according to claim 117, wherein said magenta ink comprises said water-soluble organic solvent in an amount of from 10 to 40% by weight based on the total weight of the ink.

119. The recording unit according to claim 117, wherein said water-soluble organic solvent is at least one selected from the group consisting of amides, ketones, ethers, polyalkylene glycols, alkylene glycols, lower alkyl ethers of such polyhydric alcohols, monohydric alcohols, cyclic amide compounds, and imide compounds.

120. The recording unit according to claim 113, wherein said magenta ink further comprises an oxidizing agent.

121. The recording unit according to claim 120, wherein said oxidizing agent is a salt of benzenesulfonic acid or a salt of nitrobenzenesulfonic acid.

122. The recording unit according to claim 121, wherein said salt of benzenesulfonic acid or said salt of nitrobenzenesulfonic acid is a sodium salt.

123. The recording unit according to claim 113, wherein said magenta ink comprises further a surfactant.

124. The recording unit according to claim 123, wherein said surfactant is at least one selected from the group consisting of ionic surfactants, nonionic surfactants, and amphoteric surfactants.

125. The recording unit according to claim 123, wherein said surfactant is at least one selected from the group consisting of ethylene oxide adducts of higher alcohols, ethylene oxide adducts of alkyl phenols, ethylene oxide-propylene oxide copolymers, and ethylene oxide adducts of acetylene glycol.

126. The recording unit according to claim 113, wherein said cyan ink comprises a water-soluble dye as a coloring material.

127. The recording unit according to claim 126, wherein said cyan ink comprises said water-soluble dye in an amount of from 0.2 to 8% by weight based on the total weight of the ink.

128. The recording unit according to claim 126, wherein said water-soluble dye is at least one selected from the group consisting of C.I. Acid Blue 9, C.I. Acid Blue 13, C.I. Acid Blue 68, C.I. Acid Blue 69, C.I. Acid Blue 138, C.I. Acid Blue 185, C.I. Acid Blue 249, C.I. Acid Blue 258, C.I. Direct Blue 83, C.I. Direct Blue 86, C.I. Direct Blue 87, C.I. Direct Blue 95, C.I. Direct Blue 143, C.I. Direct Blue 166, C.I. Direct Blue 176, and C.I. Direct Blue 199.

129. The recording unit according to claim 113, wherein said cyan ink comprises a mixture of water and a water-soluble organic solvent.

130. The recording unit according to claim 129, wherein said cyan ink comprises said water-soluble organic solvent in an amount of from 10 to 40% by weight based on the total weight of the ink.

131. The recording unit according to claim 129, wherein said water-soluble organic solvent is at least one selected from the group consisting of amides, ketones, ethers, polyalkylene glycols, alkylene glycols, lower alkyl ethers of such polyhydric alcohols, monohydric alcohols, cyclic amide compounds, and imide compounds.

132. The recording unit according to claim 113, wherein said cyan ink comprises further a surfactant.

133. The recording unit according to claim 132, wherein said surfactant is at least one selected from the group consisting of ionic surfactants, nonionic surfactants, and amphoteric surfactants.

134. The recording unit according to claim 132, wherein said surfactant is at least one selected from the group consisting of ethylene oxide adducts of higher alcohols, ethylene oxide adducts of alkyl phenols, ethylene oxide-propylene oxide copolymers, and ethylene oxide adducts of acetylene glycol.

135. The recording unit according to claim 92, further comprising a fourth ink holder.

136. The recording unit according to claim 135, wherein the ink held in said fourth ink holder is a black ink.

137. The recording unit according to claim 136, wherein said black ink comprises a mixture of water and water-soluble organic solvent.

138. The recording unit according to claim 137, wherein said black ink comprises said water-soluble organic solvent in an amount of from 10 to 40% by weight based on the total weight of the ink.

139. The recording unit according to claim 137, wherein said water-soluble organic solvent is at least one selected from the group consisting of amides, ketones, ethers, polyalkylene glycols, alkylene glycols, lower alkyl ethers of such polyhydric alcohols, monohydric alcohols, cyclic amide compounds, and imide compounds.

140. An ink-jet recording method for ejecting an ink through an orifice in response to a recording signal and applying it to a recording medium to perform recording, wherein said ink is the ink described in any one of claims 1 to 21.

141. The ink-jet recording method according to claim 140, wherein said ink is ejected by applying thermal energy to the ink.

142. An ink-jet recording apparatus comprising an ink cartridge provided with a recording head for ejecting an ink and an ink holder which holds the ink, and an ink supplying section for supplying the ink from said ink cartridge to the recording head, wherein said ink cartridge is the ink cartridge described in any one of claims 22 to 43.

143. An ink-jet recording apparatus comprising an ink cartridge provided with a recording head for ejecting an ink and an ink holder which holds the ink, and an ink supplying section for supplying the ink from said ink cartridge to the recording head, wherein said ink cartridge is the ink cartridge described in any one of claims 44 to 91.

144. An ink-jet recording apparatus comprising a recording unit equipped with a first ink holder, a second ink holder, and a third ink holder which hold inks of different colors, and a head assembly for ejecting said inks held in the respective ink holders, and means which detachably retains said recording unit and transmits electric signal information to said recording unit, wherein said recording unit is the recording unit described in any one of claims 92 through 139.

\* \* \* \* \*

UNITED STATES PATENT AND TRADEMARK OFFICE
CERTIFICATE OF CORRECTION

PATENT NO. : 5,865,883
DATED : February 2, 1999
INVENTOR(S) : HISASHI TERAOKA, ET AL.

It is certified that error appears in the above-indentified patent and that said Letters Patent is hereby corrected as shown below:

COLUMN 3:

Line 17, "at" should read --of--.

COLUMN 4:

Line 47, "triethanolamine" should read --triethanolamine to--.

COLUMN 7:
    Line 32, "this" should read --the--.
    Line 33, "the" should read --this--.

COLUMN 13:

Line 59, "*Acetylenol" should read --*Acetylenol EH--.

COLUMN 15:

Line 4, "*Acetylenol" should read --*Acetylenol EH--.

UNITED STATES PATENT AND TRADEMARK OFFICE
CERTIFICATE OF CORRECTION

PATENT NO. : 5,865,883
DATED : February 2, 1999
INVENTOR(S) : HISASHI TERAOKA, ET AL.

It is certified that error appears in the above-indentified patent and that said Letters Patent is hereby corrected as shown below:

<u>COLUMN 23</u>:

Line 21, "propyethylene" should read --propylene-- and "polymers," should read --copolymers,--.

Signed and Sealed this

Fifth Day of October, 1999

*Attest:*

Q. TODD DICKINSON

*Attesting Officer*     *Acting Commissioner of Patents and Trademarks*